United States Patent
Matsumoto et al.

(10) Patent No.: US 9,067,490 B2
(45) Date of Patent: Jun. 30, 2015

(54) WORK MACHINE INCLUDING BATTERY

(71) Applicant: KOBELCO CONSTRUCTION MACHINERY CO., LTD., Hiroshima (JP)

(72) Inventors: Toshihisa Matsumoto, Hiroshima (JP); Isao Miyachi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/211,548

(22) Filed: Mar. 14, 2014

(65) Prior Publication Data

US 2014/0291047 A1 Oct. 2, 2014

(30) Foreign Application Priority Data

Apr. 2, 2013 (JP) ................................ 2013-076810

(51) Int. Cl.
*B60K 15/00* (2006.01)
*B60K 15/077* (2006.01)
*B60K 15/03* (2006.01)
*E02F 3/32* (2006.01)
*E02F 9/08* (2006.01)
*H01M 2/02* (2006.01)

(52) U.S. Cl.
CPC ......... *B60K 15/077* (2013.01); *B60K 15/03006* (2013.01); *E02F 3/325* (2013.01); *E02F 9/0858* (2013.01); *H01M 2/02* (2013.01)

(58) Field of Classification Search
USPC ................................. 180/68.5, 69.4
See application file for complete search history.

(56) References Cited

U.S. PATENT DOCUMENTS

| | | | |
|---|---|---|---|
| 6,430,852 B2 * | 8/2002 | Murakami | 37/466 |
| 2006/0108309 A1 * | 5/2006 | Sato et al. | 212/232 |
| 2008/0185211 A1 * | 8/2008 | Akashima et al. | 180/367 |
| 2014/0097591 A1 * | 4/2014 | Fujimoto et al. | 280/164.1 |
| 2014/0291047 A1 * | 10/2014 | Matsumoto et al. | 180/69.4 |

FOREIGN PATENT DOCUMENTS

| | | |
|---|---|---|
| JP | 2002-356874 | 12/2002 |
| JP | 2004-152524 | 5/2004 |

* cited by examiner

*Primary Examiner* — Jeffrey J Restifo
*Assistant Examiner* — Erez Gurari
(74) *Attorney, Agent, or Firm* — Oblon, McClelland, Maier & Neustadt, L.L.P.

(57) ABSTRACT

Provided is a work machine capable of protecting a battery from splashing fuel during fuel filling. The work machine includes a fuel tank having a fuel-filler portion, a battery arranged near the fuel-filler portion, and a cover member. The cover member has a cover portion which covers an upper surface of the battery and an extension portion which continuously extends from the cover portion toward the fuel-filler portion to cover a region from the battery to the fuel-filler portion.

5 Claims, 6 Drawing Sheets

WORK MACHINE INCLUDING BATTERY

BACKGROUND OF THE INVENTION

1. Field of the Invention

The present invention relates to a work machine such as a hydraulic excavator, the work machine including a battery.

2. Description of the Related Art

In recent years, miniaturization of a work machine is being advanced. This requires various devices such as an engine and a fuel tank that are mounted on the work machine to be arranged closely to each other within a limited space. This arrangement can generate a case of locating the battery near a fuel-filler portion of the fuel tank at a high position. The battery has an upper surface, on which an electric component such as a connection terminal is exposed.

For example, Japanese Patent Application Laid-open No. 2002-356874 discloses a hydraulic excavator including a fuel tank and a battery disposed on the fuel tank. In this hydraulic excavator, the upper surface of the battery is located above the fuel-filler portion to restrain fuel, which leaks or splashes at the time of filling the fuel to the fuel tank through the fuel-filler portion, from reaching the upper surface of the battery.

The upper surface of the battery, however, is not always allowed to be located above the fuel-filler portion. Besides, there is a requirement for preventing dusts from adherence to the upper surface of the battery. For this reason, the upper surface of the battery is conventionally covered with a protection cover.

For example, Japanese Patent Application Laid-open No. 2004-152524 discloses a battery protection cover for protecting a battery disposed on a floor in a machine room. This battery protection cover has a cover body made of an insulator. The cover body is in a sheet shape, having an upper wall portion opposed to the upper surface of the battery and a hang-down portion hanging down to the floor while opposed to a vertical surface of the battery.

The cover body is attached to the battery. The battery has a pair of supporting rods protruding upward beyond longitudinally opposite ends of the upper surface of the battery, respectively. The cover body is attached to the supporting rods with screw members. Specifically, the upper wall portion of the cover body has respective through-holes corresponding to the supporting rods, and the screw members are screwed into upper ends of the supporting rods through the through-holes. The upper wall portion is thus sandwiched between the screw members and the supporting rods.

The battery protection cover, which covers the vertical surface of the battery with the hang-down portion thereof, can effectively protect the vertical surface of the battery from splashing fuel and the like; however, oil and the like is permitted to splash to a periphery of the battery. Hence, in the case of locating the battery not on the floor but at a high position, there is a risk of permitting oil and the like to splash to the periphery of the battery to stain a wide region.

SUMMARY OF THE INVENTION

An object of the present invention is to provide a work machine capable of effectively protecting a battery from a fuel splashing during fuel filling. The work machine provided by the present invention includes a fuel tank having a fuel-filler portion, a battery disposed near the fuel-filler portion, and a cover member. The cover member has a cover portion which covers an upper surface of the battery and an extension portion which continuously extends from the cover portion toward the fuel-filler portion to thereby cover a region from the battery to the fuel-filler portion. The extension portion includes a hang-down portion which hangs down from the cover portion to the fuel-filler portion side.

DESCRIPTION OF THE PREFERRED EMBODIMENT

An embodiment of the present invention is described in detail below with reference to the drawings. The following description is, however, basically exemplary, thus not limiting the present invention, an application thereof, or a usage thereof.

Figure 1:
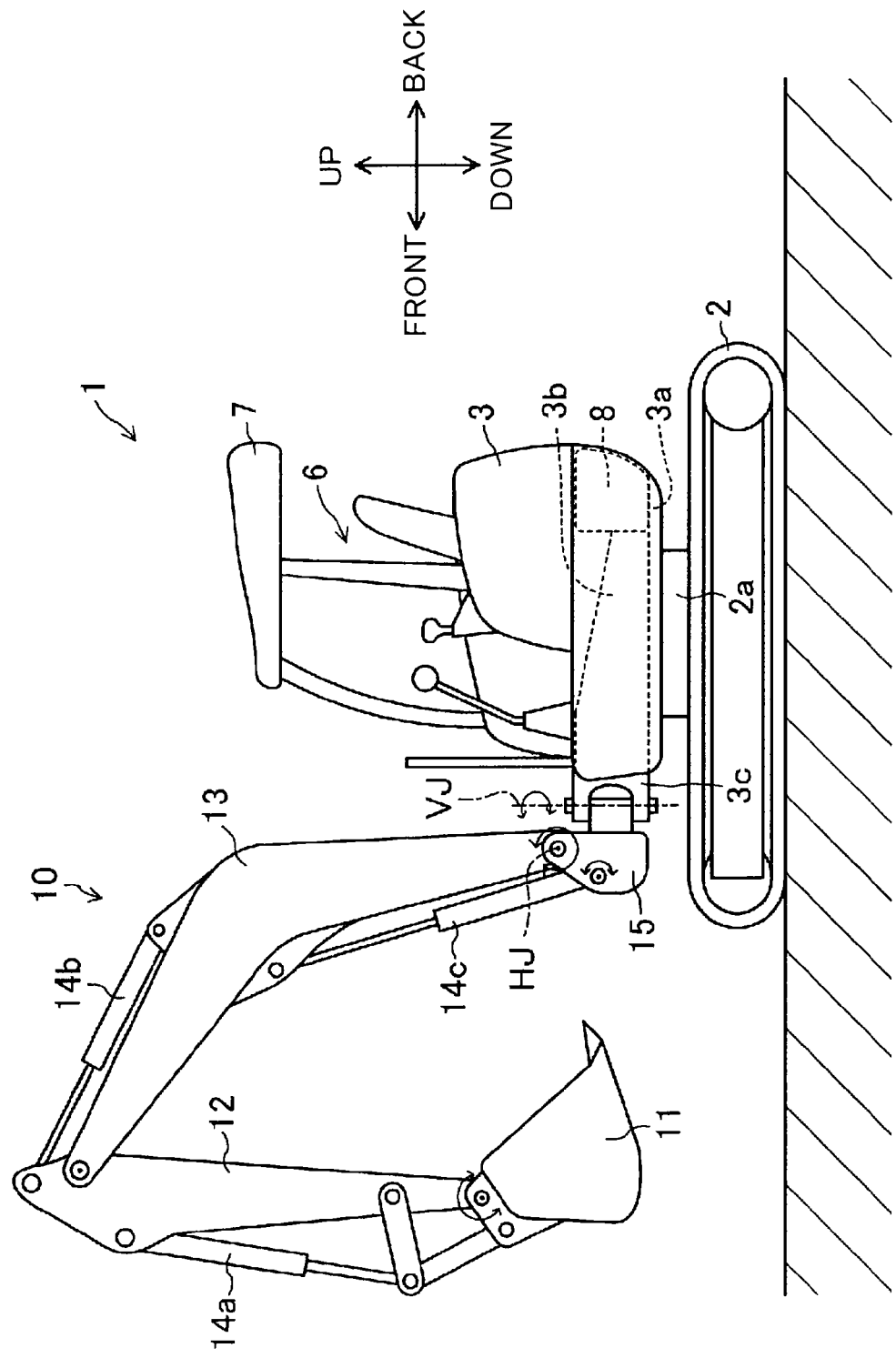
FIG. 1 is a side view of a work machine according to an embodiment of the present invention.
Figure 2:
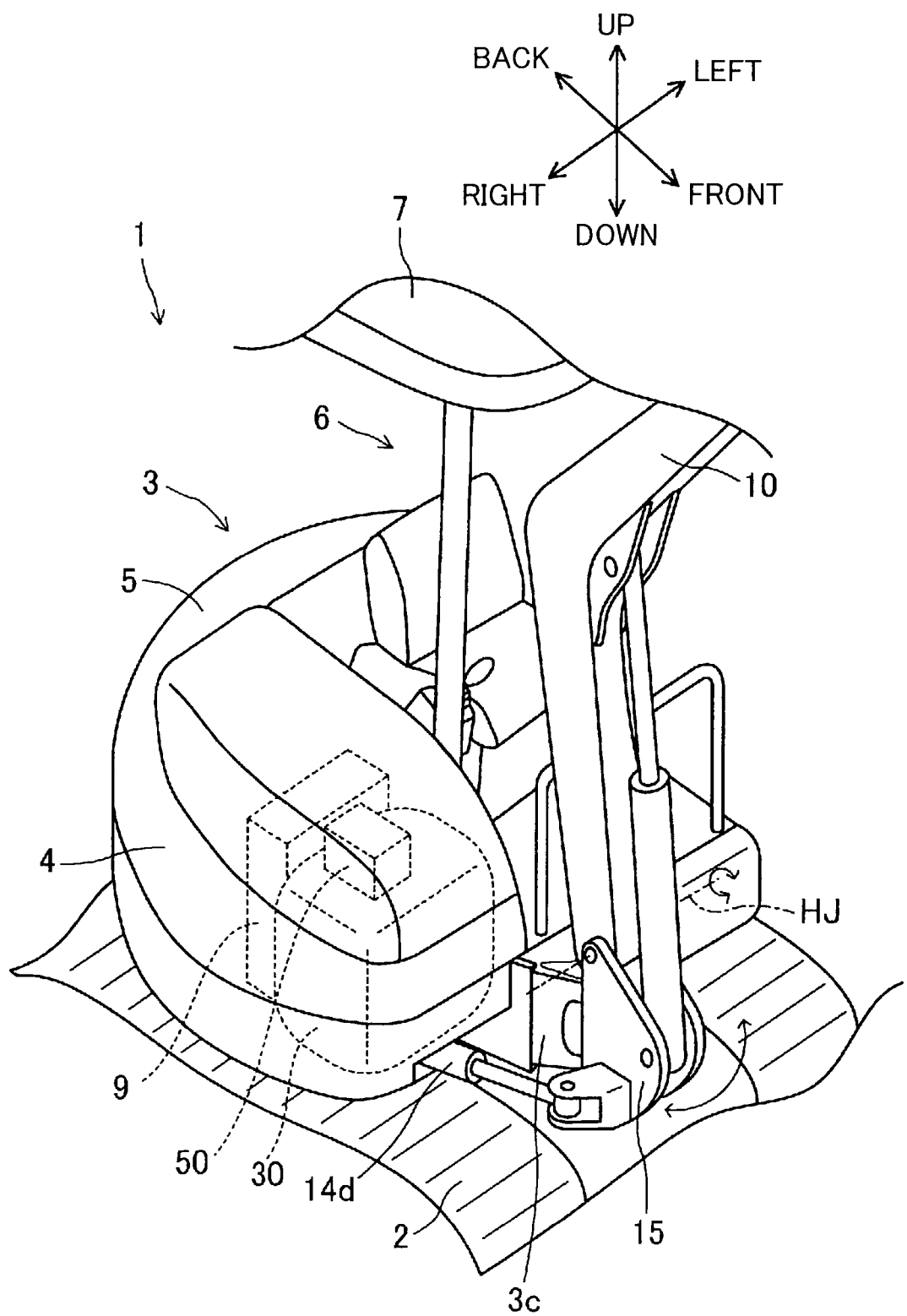
FIG. 2 is a perspective view partially showing the work machine.

FIGS. 1 and 2 show a hydraulic excavator 1 as an example of a work machine according to the present invention. The hydraulic excavator 1 is a backward small-slew type compact machine, including a crawler-type lower crawling body 2, an upper slewing body 3 slewably mounted on the crawler-type lower crawling body 2, and an attachment 10.

The upper slewing body 3 includes a first machine room 4, a second machine room 5, a hood 7, and a counterweight 8. The first machine room 4 forms a right-side portion of the upper slewing body 3, and accommodates elements of the hydraulic excavator 1, namely, a fuel tank 30, a hydraulic fluid tank 9, a battery 50, and the like. The second machine room 5 forms a rear-side portion of the upper slewing body 3 and houses an engine and the like. The upper slewing body 3 is formed with an operation space 6 at a left-side portion thereof, in which an operating seat, an operation lever, and the like are provided. The hood 7 is located at an upper side of the operation space 6 to cover the operation space 6.

Figure 3:
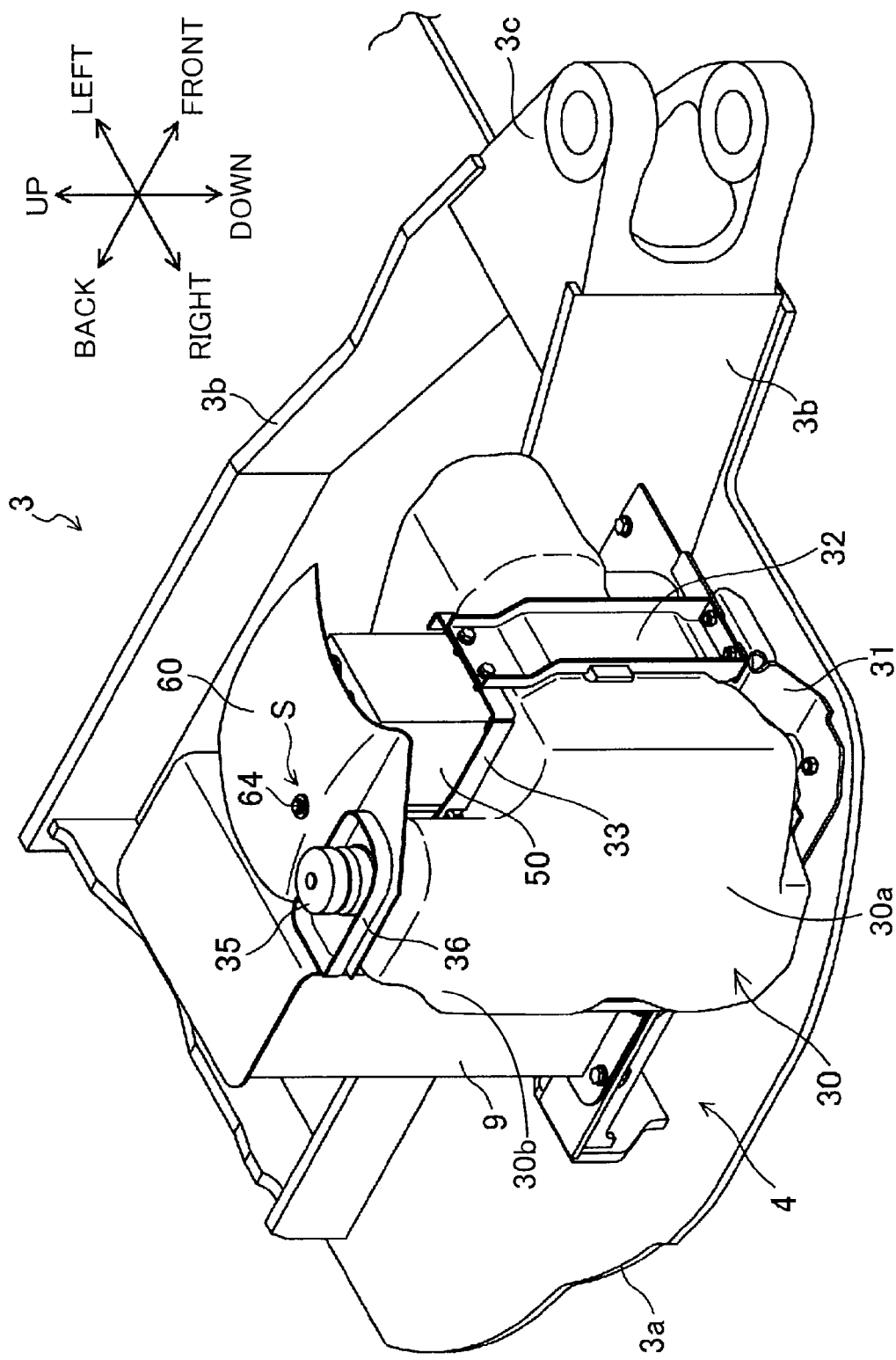
FIG. 3 is a perspective view partially showing a relevant part of the work machine.

The upper slewing body 3 includes a bottom plate 3a, a pair of vertical plates 3b, and a front bracket 3c shown in FIGS. 1 and 3. The bottom plate 3a forms a lower-side portion of the upper slewing body 3, being supported by the lower crawling body 2 via a slew bearing 2a so as to be slewable. The first and second machine rooms 4 and 5 are disposed on the bottom plate 3a. The pair of vertical plates 3b stand up on the bottom plate 3a and extend in a front-and-back direction while being separated from each other in a right-and-left direction. The front bracket 3c is fixed to respective front end portions of both the vertical plates 3b.

Unless otherwise specified, an up-and-down direction, a front-and-back direction, and a right-and-left direction in the following description are all based on the upper slewing body 3 as shown in FIG. 1 and others.

The attachment 10 is supported by a front-side portion of the upper slewing body 3 so as to be swingable around a horizontal axis HJ and a vertical axis VJ shown in FIG. 1. The attachment 10 includes: a bucket 11; an arm 12; a boom 13; a plurality of hydraulically-controlled hydraulic cylinders, namely, a bucket cylinder 14a, an arm cylinder 14b, a boom cylinder 14c, and a swing cylinder 14d; and a swing bracket 15. The bucket 11 is supported by a front portion of the arm 12 to be swung by the expansion and contraction of the bucket cylinder 14a. The arm 12 has a basal end portion, which is supported by a front end portion of the boom 13. The arm 12 is swung by the expansion and contraction of the arm cylinder 14b. The boom 13 has a base end portion, which is supported by the swing bracket 15. The boom 13 is swung around the horizontal axis HJ by the expansion and contraction of the boom cylinder 14c. The swing bracket 15 is supported by the front bracket 3c to be swung around the vertical axis VJ by the expansion and contraction of the swing cylinder 14d, as shown in FIG. 2. The thus designed attachment 10 is actuated in an up-and-down direction and a right-and-left direction according to an operation applied to an operation lever and the like. The counterweight 8 is disposed in a rear portion of the upper slewing body 3 to keep a balance in a front-and-back direction relative to the thus actuated attachment 10.

The fuel tank 30 is a container to store the fuel for driving the engine. The fuel tank 30 is formed of, for example, a synthetic resin to have a shape including concavities and convexities as shown in FIG. 3. The fuel tank 30 is disposed in a front-side portion of the first machine room 4 as a side machine room. The fuel tank 30 has a main body portion 30a and an upper extension portion 30b. The upper extension portion 30b extends upward from a part of a region (a right-side region in the embodiment) of the body portion 30a.

The hydraulic fluid tank 9 is a container to store hydraulic fluid used for hydraulic control. The hydraulic fluid tank 9 has, for example, a rectangular shape. The hydraulic fluid tank 9 is disposed adjacently to the rear side of the fuel tank 30.

The battery 50 is disposed above and across over the body portion 30a of the fuel tank 30 in a front-and-back direction. In other words, the battery 50 is adjacent to the fuel tank 30. Specifically, the battery 50 according to the present embodiment is adjacent to the body portion 30a of the fuel tank 30 at the upper side of the body portion 30a, and is adjacent to the upper extension portion 30b at the lateral side of the upper extension portion 30b.

The fuel tank 30 is installed on a base 31 mounted on the bottom plate 3a. The battery 50 is mounted on the base 31 via a vertical pillar 32 and a battery tray 33. The vertical pillar 32 extends upward from a front end of the base 31. The battery tray 33 is connected to an upper end portion of the vertical pillar 32 to be located over the fuel tank 30.

The battery 50 according to the present embodiment forms a laterally-long rectangular parallelepiped shape including an upper surface 50a, on which there are provided electric parts, such as a connection terminal, and an indicator for confirming liquid quantity of filling liquid. The battery 50 is put on the battery tray 33 so as to extend in a front-and-back direction and fastened by a fastener 34 shown in FIGS. 4 and 5.

The fastener 34 has a pressing portion 34a, a pair of arms 34b, and a nut member 34c as supporting members. The pressing portion 34a is placed on the upper surface of the battery 50 mounted on the battery tray 33. The pressing portion 34a has a slender shape across over the battery 50 in a right-and-left width direction. Each of the pair of arms 34b extends upward from the battery tray 33 and has an upper end portion. Respective upper end portions of the arms 34b and both end portions of the pressing portion 34a are fastened together, respectively to thereby cause the pressing portion 34a to press the battery 50 downward. The battery tray 33 has a pair of right and left engaging holes 33a. Each of the arms 34b has a lower end formed with a hook. The pressing portion 34a is fastened to an upper end of each arm 34b while the hooks are engaged with respective engaging holes 33a, thereby fixing the battery 50 to the battery tray 33.

The fuel tank 30 has a fuel-filler portion 35, which protrudes upward beyond the upper surface of the upper extension portion 30b, and, for example, has a cylindrical shape. The hydraulic excavator 1 further includes a fuel tray 36, which is disposed around the fuel-filler portion 35. The fuel-filler portion 35 is located near the battery 50, specifically, near a right-side surface of the battery 50, the right-side surface extending in a front-and-back direction. The fuel-filler portion 35 has a lower end 35a and an upper end 35b shown in FIG. 5. The lower end 35a is below the upper surface 50a of the battery 50. The upper end 35b is above the upper surface 50a of the battery 50.

The hydraulic excavator 1 further includes a cover sheet 60 as a cover member. The cover sheet 60 is laid over the battery 50 to prevent the fuel from splashing to the upper surface 50a of the battery 50 during fuel filling.

The cover sheet 60 is a flexible sheet-shaped member capable of having a deflection in a thickness direction of the cover sheet 60. The cover sheet 60 is formed of a material excellent in oil-resistance and electric insulation characteristics, for example, rubber or a synthetic resin. The cover sheet 60 is processed into such a shape and disposed in such a state as to improve convenience at a maintenance time of the battery 50 and improve the protection performance for the upper surface 50a of the battery 50.

Figure 4:
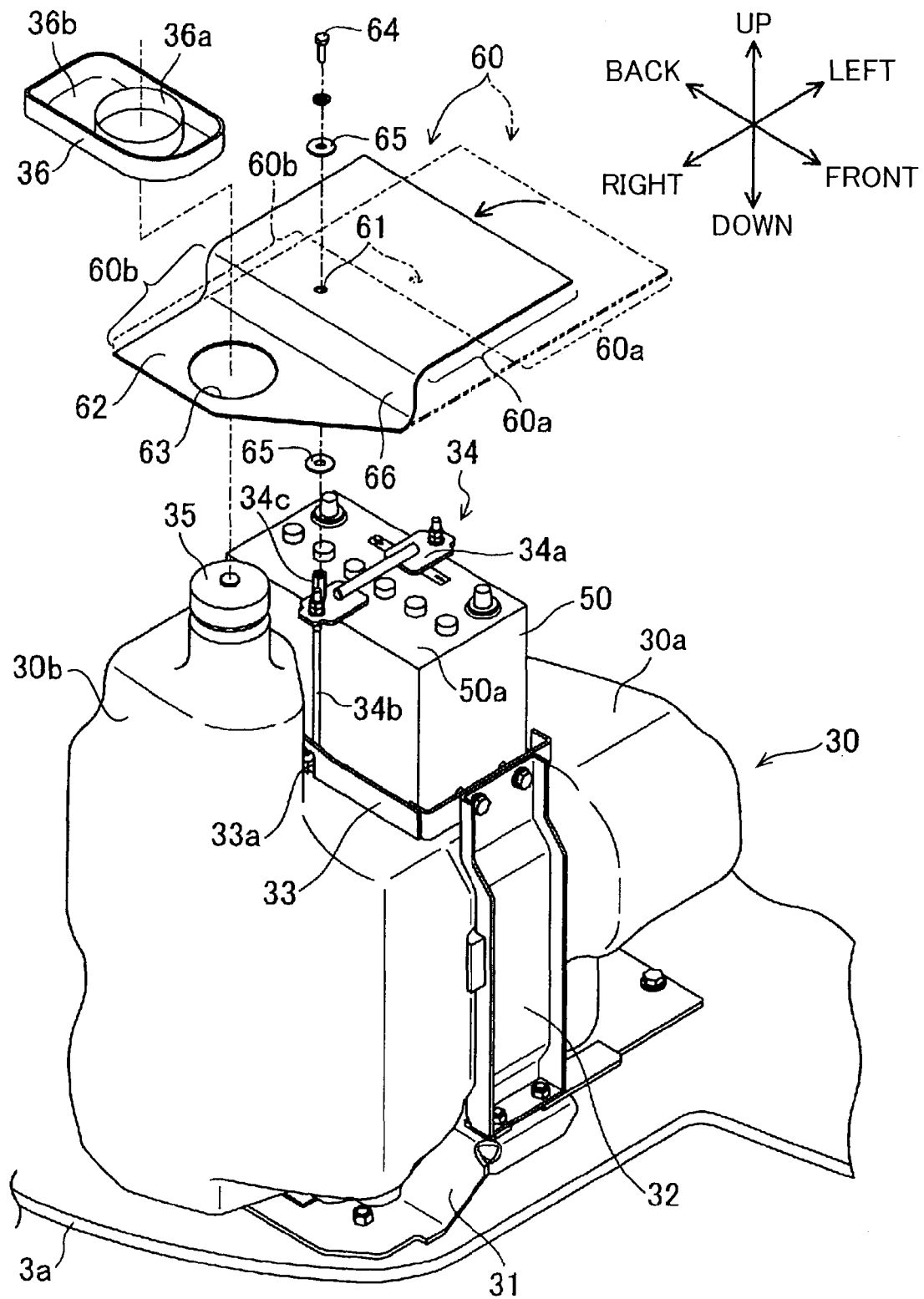
FIG. 4 is an exploded perspective view of a relevant part of the work machine.
Figure 5:
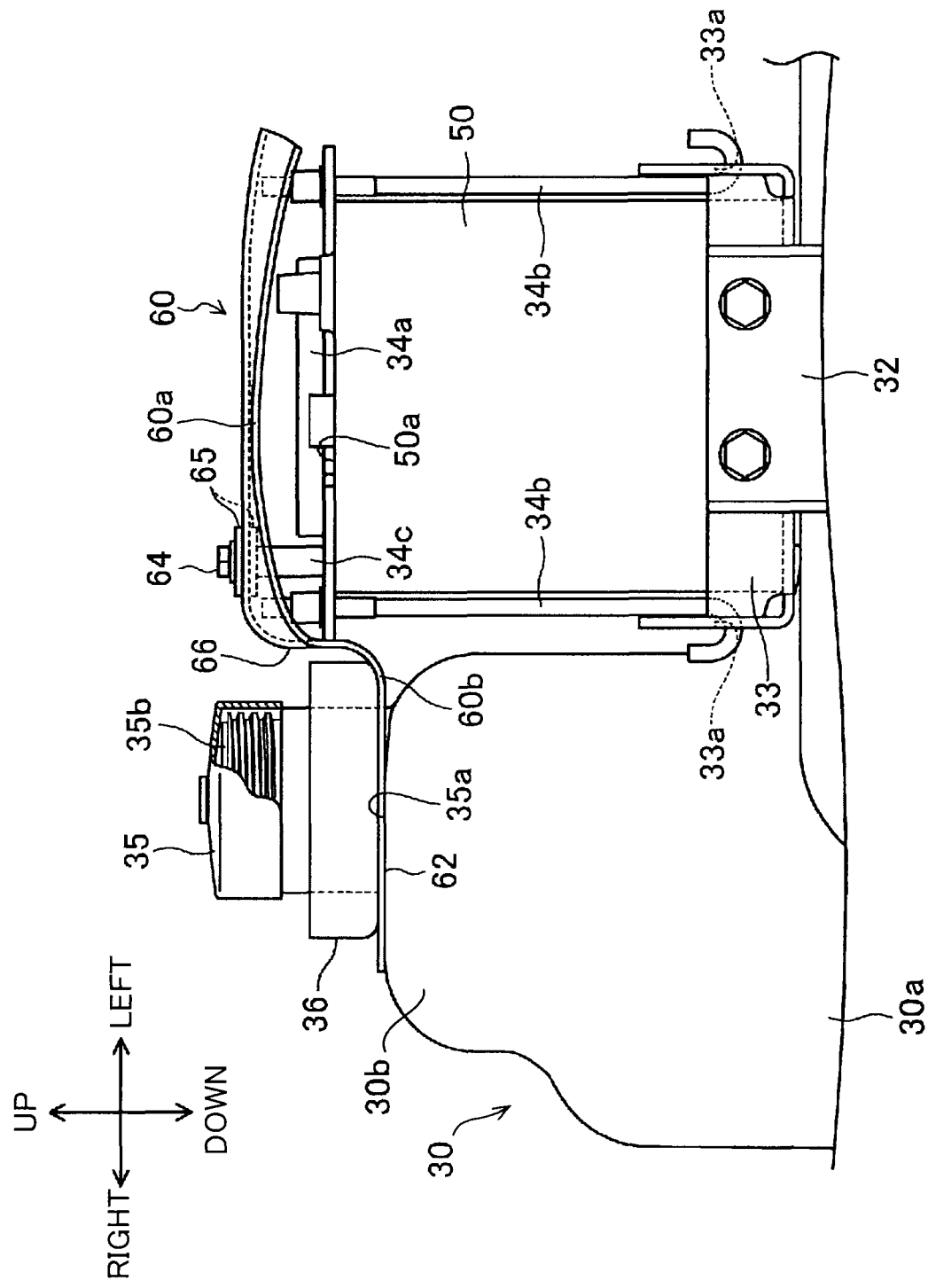
FIG. 5 is a front view of a relevant part of the work machine.

Specifically, as shown in FIG. 4, the cover sheet 60 has a cover portion 60a and an extension portion 60b as shown in FIG. 4. The cover portion 60a is a portion which covers the upper surface 50a of the battery 50. The cover portion 60a is formed in a rectangular shape larger than the upper surface 50a of the battery 50. The extension portion 60b is a portion which extends from the cover portion 60a toward the fuel-filler portion 35 to cover a region from the upper surface 50a of the battery 50 to a peripheral portion of the fuel-filler portion 35. The extension portion 60b according to the present embodiment has approximately a trapezoidal shape, whose side corresponding to a lower bottom of the trapezoid, that is, an end portion of a long-side side, is continuous with one of the long-sides of the cover portion 60a.

The cover portion 60a has a fastening hole 61, which is formed in an edge part of the cover portion 60a on the side near the extension portion 60b. The fastening hole 61 is formed in a portion intermediate longitudinally of the edge part. This intermediate portion is a center portion of the entire cover sheet 60.

The extension portion 60b has a fitting hole 63. The fitting hole 63 is formed in a part of the extension portion 60b, which part is separated from the cover portion 60a and constitutes a protruded portion 62 in a fitting state described later.

The cover sheet 60 is disposed in such a posture that the extension portion 60b extends from the cover portion 60a toward the fuel-filler portion 35. In this state, a fitting bolt 64 as a fastening member is inserted into the fastening hole 61 and fastened with the nut member 34c, thereby allowing the nut member 34c to support the cover portion 60a.

Specifically, the nut member 34c extends upward from an end portion on the side of the fuel-filler portion 35 of the pressing portion 34a at a position corresponding to a position of the fastening hole 61. The nut member 34c has an upper end portion, which is located at a height approximately equivalent to a height of the upper end 35b of the fuel-filler portion 35 and above the upper surface 50a of the battery 50.

Preferably are provided washer members 65 for leakage prevention above and below the fastening hole 61, respectively. In this case, the fitting bolt 64 inserted into the fastening hole 61 is fastened to an upper end of the nut member 34c so as to hold the leakage prevention washer members 65 axially between the fitting bolt 64 and the nut member 34c. The cover portion 60a is thereby supported in a cantilever manner by the nut member 34c at a single point (hereinafter, also referred to as a support point S) in an edge part on the fuel-filler-portion-35 side of the cover portion 60a and over the upper surface 50a of the battery 50. The other edge part of the cover portion 60a is a free end.

The cover portion 60a supported at the support point S covers the upper surface 50a of the battery 50 while having a shape of hanging down from the support point S as a crest. The cover portion 60a, thus supported at the single support point S located at an intermediate portion of a long edge part of the cover portion 60a to have a shape of hanging down while flared, hardly has a recess. Hence, even when adhered to the cover portion 60a, the fuel can be smoothly removed before accumulated on the cover portion 60a.

In addition, the flexibility of the cover sheet 60 improves maintenance workability of the battery 50. Specifically, at the time of performing periodical maintenance of the battery 50 such as confirmation of the indicator, an operator can access the upper surface 50a of the battery 50 by only turning over the cover portion 60a while letting the fitting bolt 64 remain mounted on the nut member 34c. It is, therefore, unnecessary to detach the fitting bolt 64 at each maintenance time of the battery 50. Also, the fuel can be prevented from entering the upper surface 50a of the battery 50 through the fastening hole 61 at the detach work.

On the other hand, the fitting hole 63 has a diameter permitting the fuel-filler portion 35 to pierce through the extension portion 60b while the fuel-filler portion 35 is being fitted into the fitting hole 63. The fuel tray 36 is to be placed on the extension portion 60b while being fitted with the fuel-filler portion 35 protruding upward through the fitting hole 63, thereby pressing the extension portion 60b downward. The fuel tray 36 has a cylindrical fitting portion 36a into which the fuel-filler portion 35 can be fitted, and a tray portion 36b extending outward from a lower end of the fitting portion 36a. The tray portion 36b is provided with a discharging outlet not shown for discharging the fuel that is accumulated on the tray portion 36b.

The extension portion 60b is positioned over the fuel tank 30 by the fit of the fuel-filler portion 35 into the fitting hole 63. The fuel tray 36 is disposed around the fuel-filler portion 35 by fitting an upward protruding part of the fuel-filler portion 35 beyond the extension portion 60b into the fitting portion 36a, and presses the extension portion 60b downward to cause the extension portion 60b to be supported by the fuel-filler portion 35. The extension portion 60b, thus being pressed down by the fuel tray 36 to a position lower than the support point S and the cover portion 60a supported at the support point S as shown in FIG. 4, is deformed into a shape having a hang-down portion 66 which hangs down from the cover portion 60a to the fuel-filler portion 35 side, and the protruded portion 62 protruded from the hang-down portion 66 to the fuel-filler portion 35 side.

This shape of the cover sheet 60 prevents the fuel having leaked outside the fuel tray 36 during fuel filling from flowing into the upper surface 50a of the battery 50. Specifically, the hang-down portion 66 directs the fuel to a side away from the upper surface 50a of the battery 50 to thereby protect the battery 50 from the fuel effectively even though the battery 50 is disposed near the fuel-filler portion 35. Furthermore, the extension portion 60b, covering the region from the battery 50 to the fuel-filler portion 35, can effectively prevent the fuel splashing beyond the fuel tray 36 during fuel filling from entering into a gap between the fuel tank 30 and the battery 50 or splashing to a periphery of the gap. In addition, the fit of the fuel-filler portion 35 into the fitting hole 63 enables the cover sheet 60 to be stably supported. This allows supporting members such as the fitting bolts to be reduced, thus contributing to reduction in cost of members and the number of work processes.

The work machine according to the present invention is not limited to the above embodiment, but can include other various modes.

For example, the cover sheet 60 is an example of the cover member according to the present invention, whose shape and material can be suitably changed according to specifications. The cover sheet 60 may be integrated with the fuel tray 36. The material of the cover member according to the present invention is not limited to flexible one like the cover sheet 60, but may be a resin-molded product with a higher rigidity than that of the cover sheet 60. For example, the cover member according to the present invention may have a shape including the hang-down portion and the protruded part also in a state before mounted. In this case, although the cover member is required to be detached when an operator will access the upper surface 50a of the battery 50, an excellent workability is also secured because the detachment of the extension portion 60b is easy. Besides, making at least the cover portion 60a be transparent would allow the indicator to be confirmed at an upper side of the cover member, which improves maintenance workability. Furthermore, the cover member, if being a rigid resin-molded product, can be stably supported only by the fit of the extension portion with the fuel-filler portion, which may permit the support by the battery to be omitted.

Figure 6:
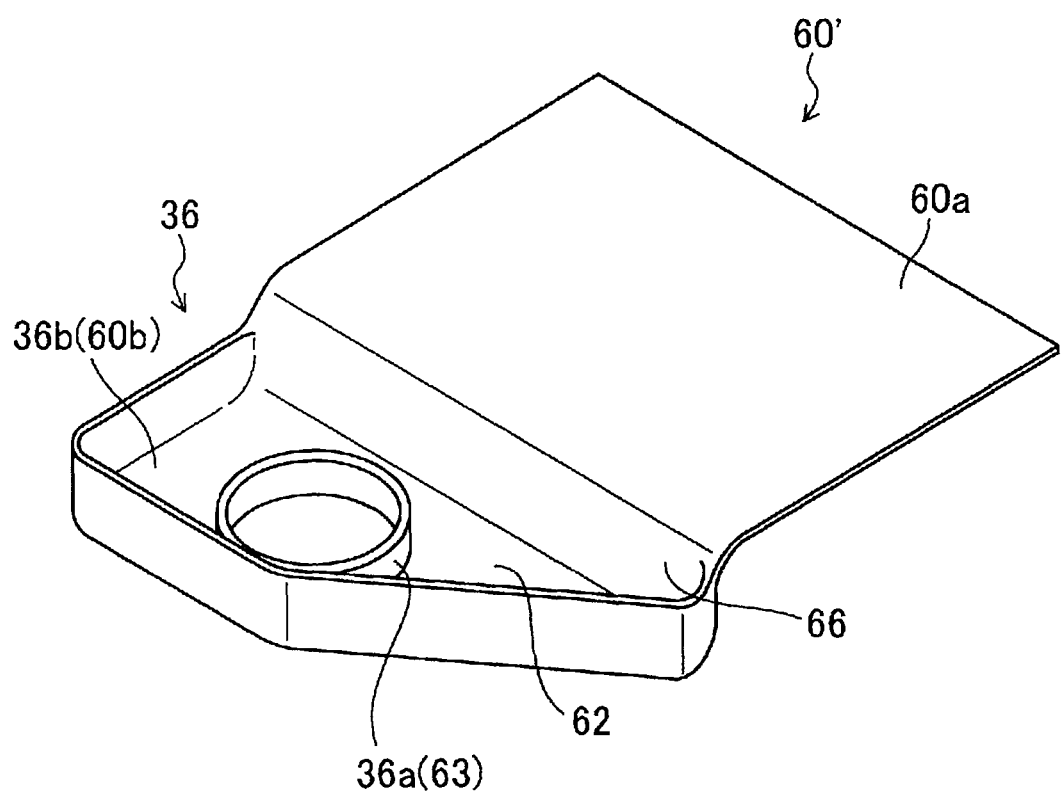
FIG. 6 is a perspective view of a relevant part of a work machine according to a modification.

The cover member according to the present invention may be one resin-molded into a shape integrally including the fuel tray 36, for example, like a cover member 160 shown in FIG. 6. This case may permit the tray portion 36b to also serve as the extension portion 60b including the hang-down portion 66 and the protruded portion 62 and permit the fitting portion 36a to also serve as the fitting hole 63.

As described above, the present invention provides a work machine capable of effectively protecting a battery from a fuel splashing during fuel filling. The work machine provided by the present invention includes a fuel tank having a fuel-filler portion, a battery disposed near the fuel-filler portion, and a cover member. The cover member has a cover portion which covers an upper surface of the battery and an extension portion which continuously extends from the cover portion toward the fuel-filler portion to thereby cover a region from the battery to the fuel-filler portion. The extension portion includes a hang-down portion which hangs down from the cover portion to the fuel-filler portion side.

According to this work machine, even when dropped out around the fuel-filler portion during fuel filling, the fuel can be received by the extension portion of the cover member. The fuel is thus prevented not only from adherence to the battery but also from widely splashing. The hang-down portion can prevent the fuel from flowing to a battery side and further effectively protect the battery from the fuel by directing the fuel adhered to the hang-down portion away from the battery.

Preferably, the cover member is formed of a sheet-shaped member capable of having a deflection in a thickness direction of the cover member; and the cover portion is supported in a cantilever manner over the battery at an edge part of the cover portion on the extension portion side and is deformable so as to be turned up to expose the upper surface of the battery.

According to the cover member, an operator can access the upper surface of the battery only by turning over the cover portion at the time of maintenance and the like.

More preferably, the cover portion is supported at only a single position of the edge part of the cover portion on the extension portion side to be deformable so as to make the supported portion be a crest. This support restrains the cover portion from having a recess to suppress accumulation of the fuel in the recess.

On the other hand, the extension portion preferably has a fitting hole into which the fuel-filler portion is fitted. This fit enables the cover member including the extension portion to be stably supported, allowing the number of members for supporting the cover member and the number of work processes for mounting the cover member to be reduced.

More preferably, the work machine further includes a fuel tray which fits with the fuel-filler portion and the extension portion is supported by the fuel-filler portion while being pressed down by the fuel tray. This arrangement enables the cover member to be supported more stably by effective utilization of the fuel tray. Besides, the combination of the fuel tray and the cover member makes it possible to more effectively prevent the fuel from being dropped out during fuel filling.

In this case, the cover member may be formed of a sheet-shaped member capable of having a deflection in a thickness direction of the cover member and the fuel tray presses down the extension portion to a position lower than the cover portion to thereby form the hang-down portion in the extension portion.

This application is based on Japanese Patent application No. 2013-076810 filed in Japan Patent Office on Apr. 2, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A work machine comprising:
   a lower crawling body;
   an upper slewing body slewably mounted on the crawler-type lower crawling body, the upper slewing body including a machine room;
   a fuel tank accommodated in the machine room, the fuel tank having a main body portion and an upper extension portion extending upward from a part of a region of the main body portion, the upper extension portion including a tank upper surface and a fuel-filler portion protruding upward beyond the tank upper surface;
   a battery accommodated in the machine room and disposed adjacent the fuel-filler portion at a lateral side of the upper extension portion, the battery including a battery upper surface; and
   a cover member accommodated in the machine room,
   the cover member including a cover portion which covers the battery upper surface and an extension portion which continuously extends from the cover portion toward the fuel-filler portion and covers a region from the battery to the fuel-filler portion, the extension portion including a hang-down portion which hangs down from the cover portion at a position between the battery and the fuel-filler portion and a protruded portion protruded from a lower end of the hang-down portion toward the fuel-filler-portion, wherein
   the protruded portion has a fitting hole having a shape to allow the fuel filler portion to be fitted into the fitting hole so as to vertically penetrate the protruded portion, the protruded portion thus being supported on the tank upper surface around the fuel-filler portion.

2. The work machine according to claim 1, wherein the cover member is formed of a sheet-shaped member; and
   the cover portion has a supported edge part at which the cover portion is supported by the hang-down portion in a cantilever manner over the battery, the sheet-shaped member having a vertical flexibility which allows the cover portion to be turned up to expose the battery upper surface of the battery.

3. The work machine according to claim 2, wherein the vertical flexibility of the cover portion allows a part of the cover portion other than the supported edge part to be deflected downward to make the supported edge part be highest in the cover portion.

4. The work machine according to claim 1, further comprising a fuel tray which fits with the fuel-filler portion and presses down the protruded portion against the tank upper surface of the upper extension portion to make the protruded portion be supported on the tank upper surface.

5. The work machine according to claim 4, further comprising a support member supporting the cover portion at a first height position above the battery upper surface, wherein the cover member is formed of a sheet-shaped member having vertical flexibility which allows the fuel tray to press down the extension portion to a second height position lower than the first height position with deformation of the extension portion, to thereby form the hang-down portion in the extension portion between the cover portion supported by the support member and the protruded portion pressed down onto the tank upper surface.

\* \* \* \* \*